United States Patent [19]

Shellhause

[11] 4,332,402
[45] Jun. 1, 1982

[54] QUICK CONNECT HYDRAULIC COUPLING ASSEMBLY

[75] Inventor: Ronald L. Shellhause, Vandalia, Ohio

[73] Assignee: General Motors Corporation, Detroit, Mich.

[21] Appl. No.: 202,128

[22] Filed: Oct. 30, 1980

[51] Int. Cl.³ ............................................. F16L 21/08
[52] U.S. Cl. ..................................... 285/86; 285/322; 285/374
[58] Field of Search ................ 285/DIG. 25, 233, 86, 285/374, 319, 315, 322, 364, 390, 420, 325

[56] References Cited

U.S. PATENT DOCUMENTS

| | | | |
|---|---|---|---|
| 2,550,591 | 4/1951 | Parsons | 285/374 X |
| 3,453,005 | 7/1969 | Foults | 285/DIG. 25 |
| 3,540,760 | 11/1970 | Miller et al. | 285/DIG. 25 |
| 3,826,523 | 7/1974 | Eschbaugh | 285/DIG. 25 |
| 3,853,338 | 12/1974 | Wilson | 285/86 |
| 3,933,378 | 1/1976 | Sandford | 285/DIG. 25 |
| 4,035,005 | 7/1977 | DeVincent et al. | 285/DIG. 25 |

FOREIGN PATENT DOCUMENTS 909478 12/1945 France ................. 285/374
1067879 2/1954 France ................. 285/374

Primary Examiner—Dave W. Arola
Attorney, Agent, or Firm—Arthur N. Krein

[57] ABSTRACT

A quick connect coupling for use in a high pressure fluid system includes a plug member in the form of a plug tube with an upset bead thereon that is adapted to be inserted into a socket member, a ring seal being positioned to encircle the pilot plug end of the tube. A split retainer is positioned to encircle the socket member and is provided with opposed sets of abutment surfaces at opposite ends thereof that are adapted to engage against the bead on the plug member and a flange provided on the socket member, respectively, when the plug member is fully inserted into the socket and a rigid locking collar is positioned to encircle the split retainer whereby to bias the split end thereof with its associate abutment surfaces radially inward into positive locking engagement with the flange of the socket member.

3 Claims, 4 Drawing Figures

QUICK CONNECT HYDRAULIC COUPLING ASSEMBLY

FIELD OF THE INVENTION

This invention relates to quick connect type couplings and, in particular, to such a type coupling assembly that is adapted for use in high pressure fluid systems, such as a high pressure hydrualic system.

DESCRIPTION OF THE PRIOR ART

In various fluid systems, conduits are connected together by suitable couplings, for example, as by means of quick connect couplings. In one common type of quick connect coupling, the plug member, such as a beaded tube, and its associated socket member are normally sealed by an annular seal ring that is positioned in compressed abutment against opposing annular surfaces of these members and, these members are retained, with the plug member fully inserted into the associated socket member, by means of a spring fingered retainer.

Differing forms of this type of quick connect coupling are well known as shown, for example, in U.S. Pat. No. 2,550,591 entitled "Tube Fitting Assembly" issued Apr. 24, 1951 to John B. Parsons; No. 3,453,005 entitled "Quick Connect Safety Coupling" issued July 1, 1969 to Jonathon A. Foults; No. 3,826,523 entitled "Quick Connect Tube Coupling Joint" issued July 30, 1974 to John T. Escheaugh; No. 3,933,378 entitled "Quick Connect Tubing Coupling" issued Jan. 20, 1976 to Phillip A. Sandford and John D. York; and No. 4,035,005 entitled "Quick Connect Coupling with Weather Seal" issued July 12, 1977 to Patsy DeVincent, Robert L. Jones and Michael P. Rose.

The use of quick connect couplings of the type shown in most of the above-identified United States patents has normally been limited to systems which carry fluid at relatively low pressure. This is due to the fact that the finger catches of the spring fingered retainer, as used on most of these couplings, to retain the plug and socket members in mated engagement with each other are not capable of withstanding high axial loads as when the conduits are carrying fluid at a range of relatively high pressure.

However, of the various forms of couplings shown in the above-identified U.S. patents, it would appear that the quick connect tube coupling joint arrangement shown in the U.S. Pat. No. 3,826,523 would appear capable of use in a system carrying relatively high pressure fluid. However, the fitting of this joint assembly of the U.S. Pat. No. 3,826,523 patent structure uses an internal receiver groove which is relatively expensive to manufacture, that is, the fitting would require machining to form the groove and, if for a particular application the fitting is preferably a molded part, it would be apparent that this internal receiver groove could not be easily molded in place. In addition, it should be noted that the effective depth of this internal receiver groove is limited to the short amount of finger travel that is available to engage and disengage the catch points.

SUMMARY OF THE INVENTION

A primary object of this invention is to provide an improved quick connect coupling that is adapted for use in coupling together fluid passages in a high pressure fluid system.

Accordingly, another object of this invention is to provide an improved quick connect coupling assembly that includes an annular lock collar encircling a split fitting retainer so as to radially bias this retainer inward into positive locking engagement with the tube and socket members of the coupling structure.

A further object of this invention is to provide an improved quick connect coupling, which in a preferred embodiment, includes a split retainer that is adapted to be removed from a beaded tube during servicing of the coupling assembly.

Still another object of this invention is to provide an improved quick connect coupling assembly of the above type which includes features of construction, operation and arrangement, rendering it easy and inexpensive to manufacture, which is easy to service, and which is adapted for use in fluid systems carrying fluids at relatively high pressures.

These and other objects of the invention are obtained in a quick connect, readily detachable conduit coupling assembly in which a tubular plug is provided at a pilot plug end thereof with an annular upset bead thereon, an O-ring seal being positioned to encircle the pilot plug end of the tubular plug outboard of the annular bead thereon. This tubular plug is adapted to be inserted into a socket member with the O-ring seal in sealing engagement between the socket member and the tubular plug when the plug is fully inserted into the socket member. A split retainer of spring material is positioned to encircle the socket member and this retainer is provided with opposed sets of finger catches, one set of which is sized so as to engage against the opposite side of the annular bead on the plug member while the other set is adapted to engage an annular flange provided for this purpose on the socket member. A rigid locking collar encircles the spring retainer whereby to normally bias the split end thereof radially inward so as to effect a more positive locking engagement of the associated spring catches against the socket flange. In a preferred embodiment, the retainer is of semi-circular configuration with an open side so as to permit it to be snapped on and off the beaded tube to allow serviceability of this part without the need to reform the beaded tube.

For a better understanding of the invention, as well as other objects and further features thereof, reference is had to the following detailed description of the invention to be read in connection with the accompanying drawings, wherein:

DESCRIPTION OF THE PREFERRED EMBODIMENT

Figure 1:
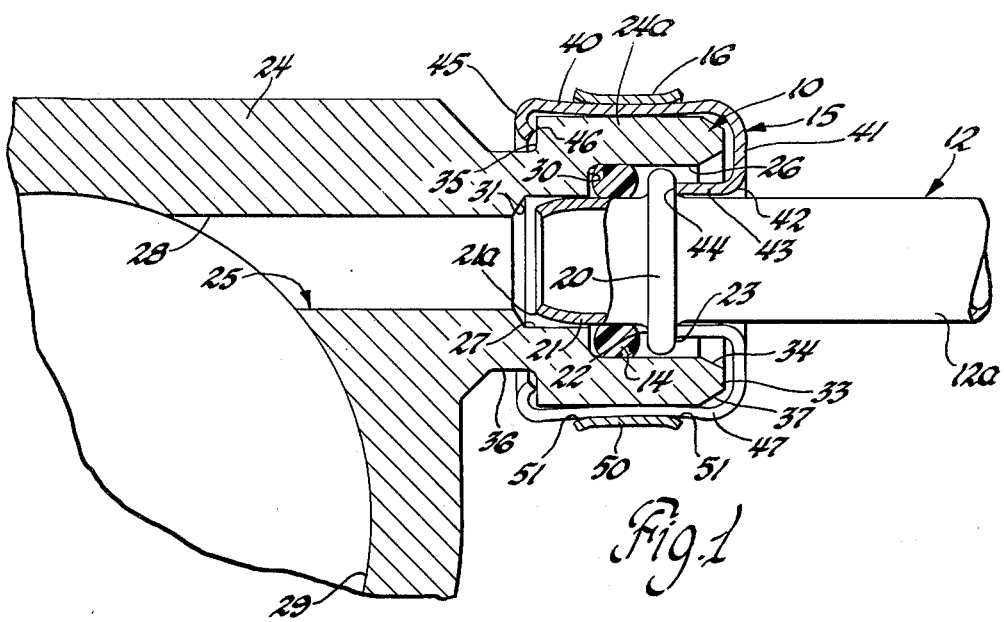
FIG. 1 is a longitudinal, cross sectional view of a preferred embodiment quick connect coupling assembly in accordance with the invention, the socket and plug members of this assembly being shown as fully coupled together.
Figure 2:
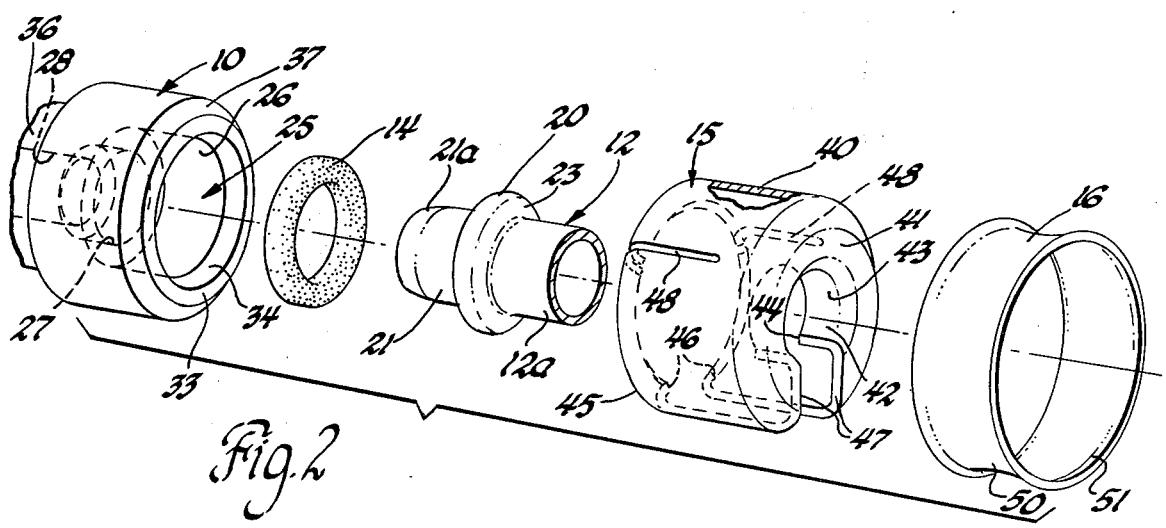
FIG. 2 is an exploded perspective view of the quick connect coupling assembly of FIG. 1.

Referring now to FIGS. 1 and 2 of the drawings, the quick connect coupling of the invention includes as major components thereof an outer female socket member or socket 10, a tubular plug member or male plug 12, a fluid seal ring 14, a retainer 15 used to releasably secure the socket 10 and plug 12 in assembled relationship to each other, and a locking collar 16, all of these components to be described in detail hereinafter.

The socket 10 is adapted to telescopically receive the plug 12 whereby these members are used to couple two fluid conduits together. These conduits may be, for example, tubes, pipes, flexible high pressure hoses or conduit passages in machined elements. Thus the socket 10 may be a separate element with a conduit suitably secured thereto or, as shown, it may be formed as an integral part of another machine element.

The plug 12 may also be formed as a separate element with a conduit suitably secured thereto or, as shown, it is formed as an integral part of a conduit which itself may be a separate element or part of a machine element. Thus, as shown, the plug 12 is formed at one end of a conduit in the form of a tube 12a and includes an upstanding annular bead 20 with a tubular pilot portion 21 extending therefrom to the free or plug end of the tube 12a. Preferably, as shown, the free end of the pilot portion 21 is radially inwardly tapered, as at 21a, to facilitate assembly of this element into socket 10.

Bead 20, which can be upset or otherwise formed on the tube 12a, provides on one side thereof an annular radial shoulder 22 facing the pilot portion end 21 of the plug and, on its other side, an opposite facing annular radial abutment shoulder 23. In the construction illustrated, the abutment shoulder 23 will be positioned inside the socket 10, when the plug 12 is fully inserted therein.

Socket 10, in the embodiment illustrated is formed as an integral part of a machine element 24 that forms part of a relatively high pressure hydraulic system, although it will be apparent, as described hereinabove, that the socket could be formed as an integral end part of a tube or other conduit member. Referring again to the embodiment illustrated, the socket 10 is formed in a cylindrical boss-like extension 24a of the machine element 24 that is provided with a stepped bore 25 therethrough. This stepped bore defines in succession starting from the free end of the extension at least a cylindrical first internal wall 26, a cylindrical second internal wall 27 and a cylindrical third wall 28, the latter forming a passage opening into an interior cavity 29 within the machine element 24. Walls 27 and 28 are of progressively reduced diameters relative to the wall 26. As shown, the wall 26 is of a suitable internal diameter greater than the outside diameter of the bead 20 whereby the bead can be slidably received therein and the wall 27 is of an internal diameter suitably greater than the maximum outside diameter of the pilot portion 21 so as to slidably receive this pilot portion therein.

Walls 26 and 27 are interconnected, in the embodiment illustrated, by a flat shoulder 30. Walls 27 and 28, in the construction illustrated, are interconnected by an inclined shoulder 31. In addition, in the embodiment illustrated, wall 26 is interconnected to the free or outboard end surface 33 of the socket 10 by an annular inclined shoulder 34 which provides a guiding surface to effect co-axial alignment of the plug 12 with socket 10.

Socket 10 is also provided with an annular flange 35 on the exterior thereof that faces inboard and is located intermediate the ends of the socket, this flange 35, in the embodiment illustrated is provided by the neck down portion 36 of the socket extension 24a. In addition, the socket 10 at its free or outboard end is provided with an annular beveled surface 37 for a purpose to be described in detail hereinafter.

With the machine element 24 and its integral socket 10 structure thus described, it will now be apparent that this element can be fabricated, if desired, as a molded part which can, for example, be made of a plastic material that is suitable for the intended function.

The seal ring 14, which may be in the form of an O-ring or in the form of a ring of square-cross section, is positioned to encircle the pilot portion 21 so as to effect sealing engagement therewith and with the socket 10 when the plug 12 is fully inserted therein, the position shown in FIG. 1.

Retainer 15, made for example of SAE 302 stainless steel, and in the preferred embodiment shown in FIGS. 1 and 2, is of open sided tubular configuration and includes a semi-circular outer sleeve 40 of a suitable diameter to loosely encircle the outer cylindrical body portion of extension 24a of socket 10. As shown, sleeve 40 has formed integral with one end thereof a C-shaped base 41 having a central opening 42 formed by an inwardly extending semi-circular flange portion 43 that is substantially concentric with outer shell and which at its free end provides an abutment surface 44 that is adapted to abut against the abutment shoulder 23 of the bead 20. Also as shown, the inside diameter of the flange portion 43 is suitably greater than the outside diameter of the tube 12a so that this tube can be slidably received therein.

At its opposite end the shell 40 is formed integral with a return bent portion 45 that terminates at its free end in an abutment surface 46 facing the abutment surface 44 at the opposite end of the retainer.

In the preferred embodiment of retainer 15, as best seen in FIG. 2, this retainer is suitably formed in a semi-circular configuration so as to provide an open side along its longitudinal length as defined by longitudinal side edges 47. The spacing between edges 47 is preselected relative to the outside diameter of the tube 12a so that the retainer 15 can be snapped on or off the tube by sideways motion relative thereto. This feature is desirable when servicing this type of coupling in certain high pressure hydraulic systems, since during servicing of such a system it may be necessary to disconnect the plug 12 from the socket 10. When this is required, it may then be desirable to replace the used retainer 15 with a new retainer without having to either replace or reform the plug 12.

In addition and as best seen in FIG. 2, the retainer 15 is provided with at least a pair of lance cuts 48, each of which extends a predetermined distance from the return bent portion 45 forwarded approximately one-half to three-quarters of the axial length through the sleeve 40. In a particular application, these lance cuts were formed by the removal of 0.12 inch wide strips of metal with the inner ends of these cuts formed with a suitable radius. These lance cuts 48 are preferably circumferentially spaced apart so that they together with the open side of the retainer 15 divide the return bent portion 45 and a portion of the sleeve 40 into a plurality of flexible fingers with finger catches at their free ends of similar circumferential extent, as now defined by the abutment surface 46, that are adapted to abut against the flange 35 to effect retention of the plug 12 in socket 10.

Referring now to the locking collar 16, this collar is made of a suitable material and includes an annular base 50, the free ends of which are preferably turned up so as to provide cam surfaces 51 that are operative to facilitate forced movement of the locking collar onto the outer peripheral surface of the retainer 15 during assembly thereon to the position as shown in FIG. 1. The inside diameter and the axial extent of the base 50 of this locking collar 16 are preselected relative to the outside diameter of the sleeve 40 portion and the axial extent of the lance cuts 48 of the associate retainer 15 so that it will substantially encircle only the split portion of this retainer whereby to bias and hold the return bent portions 40 thereof radially inward whereby the finger catches defined thereby are in positive locking engagement with the flange 35 of the socket 10.

By the use of the locking collar 16, and positioning it to encircle the split spring retention fingers of the retainer, the retainer itself is then operative to withstand a higher axial load tending to separate the plug 12 from socket 10, as when this coupling is used in a high pressure hydraulic system. It will be apparent this force can be substantially greater than what the retainer, per se, could withstand if the locking collar 16 is not operatively associated with it in the manner described.

For assembling the subject quick connect coupling, the plug 12, with the seal ring 14 encircling the pilot tube 21 thereof, is slid into socket 10 to a position as shown in FIG. 1. The retainer 15, if not already positioned to encircle the tube 12a is first snapped sideways onto the tube 12a, is then forced over the cylindrical outer body portion of the socket 10 until the abutment surfaces 46 at the ends of the return bent portions 45 snap into engagement with the flange 35.

It will be apparent that as retainer 15 is moved axially toward the socket 10, the leading edges of the return bent portions 45, in terms of the direction of movement of retainer 15 relative to socket 10, will first engage the beveled surface 37 at the end of the socket so as to be cammed radially outward thereby, whereby these portions can then ride over the outer peripheral surface of the socket until the abutment surfaces 46 pass over the flange 35, after which these return bent portions are then free to snap into engagement against the flange.

Thereafter to complete the assembly, the locking collar 16 is then axially forced onto the retainer 15 to the position shown in FIG. 1, a position at which its base 50 encircles the split or lanced portion of the retainer whereby to effect further radial inward movement of the return bent portions to effect locking engagement of the abutment surfaces 46 against the flange 35.

Figure 3:
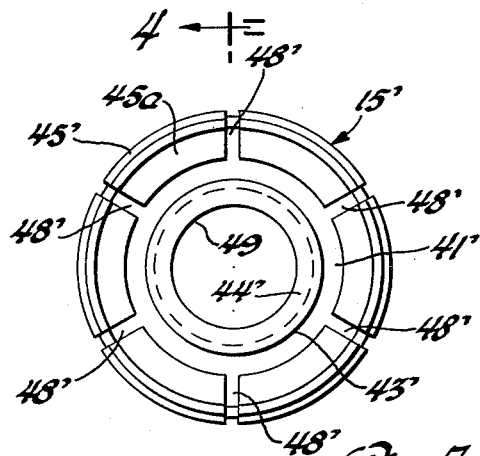
FIG. 3 is an end view of an alternate retainer for use in a coupling assembly of the type shown in FIG. 1; and, FIG. 4 is a longitudinal sectional view of the alternate embodiment retainer of FIG. 3 taken along line 4—4 of FIG. 3.
Figure 4:
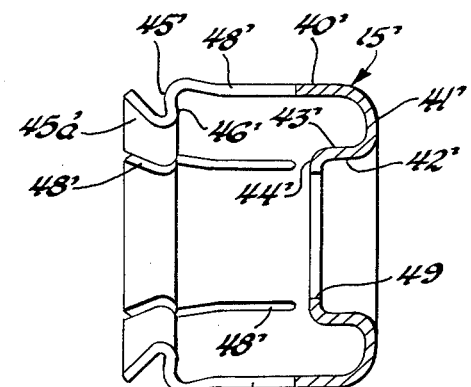

An alternate embodiment of a retainer 15' for use with the quick connect coupling of the invention as illustrated in FIGS. 1 and 2, is shown in FIGS. 3 and 4, wherein similar parts are designated by similar numerals with the addition of a prime (') where appropriate.

Retainer 15' has an annular sleeve 40' with a base 41' at one end thereof that is provided with a central opening 42' formed by an axial inward extending annular flange portion 43' terminating at a radially inward extending annular abutment surface 44'. This latter surface 44' extends radially inward a suitable distance whereby to define an opening 49 of a suitable diameter whereby this flanged end of the retainer can slidably encircle the tube 12a so that the surface 44' can abut against the abutment surface 23 of bead 20.

Sleeve 40' at its opposite end has a substantially S-shaped return bent portion 45', when viewed in cross section, formed integral therewith. This return bent portion 45' being shaped so as to define an inward facing flange-like abutment surface 46' of a suitable diameter for engagement with the flange 35 of socket 10 and its free end portion is so formed as to define a ramp surface 45a' that is adapted to cooperate with the beveled surface 37 of the socket member to facilitate the assembly of the retainer 15' thereto.

In addition, the retainer 15' is provided with a plurality of circumferential equally spaced apart lance cuts 48', each of which extends a predetermined distance from the return bent portion 45' forward approximately one-half to three-quarters of the axial length through the sleeve 40'. In the embodiment illustrated, six such lance cuts 48', similar to those described with reference to the embodiment of FIGS. 1 and 2, are used so as to divide the return bent portion 45 and a portion of the sleeve 40 into six flexible fingers with finger catches at their free ends of similar circumferential extent, these finger catches, in effect, being defined by the now subdivided abutment surface 46'.

It will now be apparent to those skilled in the art that any number of lance cuts 48' may be used, as desired, but it should be realized that if, for example, only three lance cuts are made the resulting flexible fingers would probably be deformed to a greater extent during assembly of the retainer to the socket 10 than if six such flexible fingers are formed by the use of six lance cuts, as shown. It should however be noted that, as the number of lance cuts 48' increases, the total effective engagement area of the abutment surfaces 46' with the flange 35 is reduced accordingly.

While the invention has been described with reference to the structures disclosed herein, it is not intended to be confined to the details set forth since various changes can be made by those skilled in the art without departing from the spirit of the invention. For example, a conventional anti-extrusion means, not shown, can be associated with the seal ring 14 in a known manner to prevent its extrusion through the annular clearance space between the outer peripheral surface of the bead 20 and the wall 26. Accordingly, this application is intended to cover such modification or changes as may come within the purposes of the improvement or the scope of the following claims.

The embodiments of the invention in which an exclusive property or privilege is claimed are defined as follows:

1. A quick connect conduit coupling comprising a socket member having a tube receiving socket aperture at one end thereof interconnected by a radial inward extending shoulder to a flow passage means therein; said socket member having an external annular flange thereon spaced from said one end of said socket member; a tube having an upstanding annular bead thereon with a pilot tube portion extending therefrom; an annular seal encircling said pilot tube portion adjacent one side of said annular bead; said pilot tube portion and said bead with said seal on said pilot tube portion being adapted to be sealingly slidably received in said socket aperture; an annular, resilient split retainer having radially inward extending first return bent portions at one end thereof terminating in first abutment surfaces of an unstressed internal diameter less than the outer diameter of said flange whereby it is adapted to be slidably received over said annular flange of said socket member and a radially inward extending second return bent portion at its opposite end terminating in a second abutment surface of an unstressed internal diameter less than the maximum diameter of said annular bead whereby it is adapted to be slidably received over said annular bead so that said second abutment surface can be positioned to engage against the opposite side of said annular bead; and, an annular collar adapted to encircle said split retainer intermediate the ends thereof whereby to bias said first return bent portions radially inward so as to effect locking engagement of said first abutment surfaces against said annular flange whereby to effect retention of said tube in said socket member.

2. A quick connect conduit coupling comprising a socket member having a tube receiving socket aperture means extending from the free end thereof and having an external annular flange thereon axially spaced from said free end; a tube having an upstanding annular bead thereon with a pilot tube portion extending therefrom; an annular seal encircling said pilot tube portion adjacent one side of said annular bead; said pilot tube portion and said bead of said tube with said seal in said pilot tube portion being adapted to be sealingly slidably received in said socket aperture means; an open sided, semi-cyclindrical, resilient split retainer having radially inward extending first return bent portions at one end thereof terminating in first abutment surfaces of an unstressed internal diameter less than the outer diameter of said flange whereby it is adapted to be slidably received over said annular flange of said socket member and a radially inward extending second return bent portion at its opposite end terminating in a second abutment surface of an unstressed internal diameter less than the maximum diameter of said annular bead whereby it is adapted to be slidably received over said annular bead so that said second abutment surface can be positioned to engage against the opposite side of said annular bead; and, an annular collar adapted to encircle the split portion of said split retainer whereby to bias said first return bent portions radially inward so as to effect positive locking engagement of said first abutment surfaces against said annular flange whereby to effect retention of said tube in said socket member when said coupling is used in a high pressure fluid system.

3. A quick connect conduit coupling including a socket member having a tube receiving socket aperture means extending from one end thereof and an unstressed external annular flange thereon adjacent to said one end; a plug tube having an upstanding annular bead thereon; an annular seal encircling said plug tube adjacent one side of said annular bead; said plug tube with said bead thereon and said seal being adapted to be sealingly slidably received in said socket aperture means; an annular, resilient split retainer positioned to encircle said plug tube, said split retainer including a sleeve split at one end and having a radially inward extending first return bent portions at said one end which terminate in first abutment surfaces of an unstressed internal diameter less than the outer diameter of said flange whereby to be slidably received over said annular flange of said socket member, said sleeve having a radially inward extending second return bent portion at its opposite end terminating in a second abutment surface of an unstressed internal diameter less than the maximum diameter of said annular bead for engagement against the opposite side of said annular bead from said seal; and, an annular collar encircling said split end of said sleeve and said first return bent portions of said split retainer whereby to bias said first return bent portions radially inward so as to effect locking engagement of said first abutment surfaces against said annular flange of said socket member.

* * * * *